United States Patent [19]

Ohe et al.

[11] Patent Number: 4,723,127
[45] Date of Patent: Feb. 2, 1988

[54] AUTOMOBILE ANTENNA SYSTEM

[75] Inventors: Junzo Ohe; Hiroshi Kondo, both of Aichi, Japan

[73] Assignee: Toyota Jidosha Kabushiki Kaisha, Toyota, Japan

[21] Appl. No.: 807,024

[22] Filed: Dec. 9, 1985

[30] Foreign Application Priority Data

Dec. 12, 1984 [JP] Japan ................... 59-263272
Jan. 29, 1985 [JP] Japan ................... 60-16116

[51] Int. Cl.⁴ .................................... H01Q 1/32
[52] U.S. Cl. ........................ 343/712; 43/713;
43/725; 43/728; 43/855; 343/876; 343/893
[58] Field of Search ............... 343/711, 712, 713, 725,
343/728, 844, 855, 876, 893; 455/272, 273, 274, 277

[56] References Cited

U.S. PATENT DOCUMENTS

| | | | |
|---|---|---|---|
| 2,200,674 | 5/1940 | McDonald, Jr. | 250/14 |
| 2,212,253 | 8/1940 | Stief | 250/33 |
| 2,404,093 | 7/1946 | Roberts | 250/33 |
| 2,481,978 | 9/1949 | Clough | 250/33 |
| 2,520,986 | 9/1950 | Williams et al. | 343/712 |
| 2,575,471 | 11/1951 | Schweiss et al. | 343/712 |
| 2,740,113 | 3/1956 | Hemphill | 343/787 |
| 2,774,811 | 12/1956 | Shanok et al. | 174/110 |
| 2,859,441 | 11/1958 | Rosenbaum | 343/712 |
| 2,950,479 | 8/1960 | Pan | 343/702 |

(List continued on next page.)

FOREIGN PATENT DOCUMENTS

| | | |
|---|---|---|
| 0181120 | 5/1986 | European Pat. Off. . |
| 0181200 | 5/1986 | European Pat. Off. . |
| 0181765 | 5/1986 | European Pat. Off. . |
| 0182497 | 5/1986 | European Pat. Off. . |
| 0183523 | 6/1986 | European Pat. Off. . |
| 0183520 | 6/1986 | European Pat. Off. . |
| 0183443 | 6/1986 | European Pat. Off. . |
| 889618 | 9/1953 | Fed. Rep. of Germany . |
| 1131762 | 6/1962 | Fed. Rep. of Germany . |
| 1949828 | 10/1969 | Fed. Rep. of Germany . |
| 7015306 | 4/1970 | Fed. Rep. of Germany . |
| 2701921 | 1/1977 | Fed. Rep. of Germany . |
| 2745475 | 8/1977 | Fed. Rep. of Germany . |
| 2821202 | 5/1978 | Fed. Rep. of Germany . |
| 2733478 | 2/1979 | Fed. Rep. of Germany . |
| 5944861 | 9/1957 | Japan . |
| 129464 | 2/1959 | Japan . |
| 53-22418 | 8/1978 | Japan . |
| 53-34826 | 8/1978 | Japan . |
| 0046617 | 4/1980 | Japan . |

OTHER PUBLICATIONS

Patent Abstracts of Japan, vol. 7, No. 162 (E-187)[1307], Jul. 15, 1983; & JP-A-58 70642 (Toyota Jidosha Kogyo K.K.) 27-04-1983.

Patent Abstracts of Japan, vol. 7, No. 162 (E-187)[1307], Jul. 15, 1983; & JP-A-58 70640 (Toyota Jidosha Kogyo K.K.) 27-04-1983.

Patent Abstracts of Japan, vol. 6, No. 37 (E-97)[915], Mar. 6, 1982; & JP-A-56 156 031 (Nissan Jidosha K.K.) 02-12-1981.

*Primary Examiner*—William Sikes
*Assistant Examiner*—Robert E. Wise
*Attorney, Agent, or Firm*—Cushman, Darby & Cushman

[57] ABSTRACT

An automobile antenna system is composed of a windshield antenna provided on a windshield of a vehicle body, and a pair of high-frequency pickups provided at a portion of a vehicle body which is remoted from the windshield, at both ends thereof. The output of the windshield antenna and the output obtained by adding the outputs of the high-frequency pickups together are selectively fetched by a diversity reception circuit in accordance with the reception sensitivity of each antenna, whereby space diversity reception is enabled. The high-frequency pickups are secured to a roof panel, a trunk lid, front pillars, or the like, in order to detect the surface currents induced on the vehicle body by broadcast waves and flowing at the marginal portions of the vehicle body.

13 Claims, 25 Drawing Figures

U.S. PATENT DOCUMENTS

| | | | |
|---|---|---|---|
| 2,971,191 | 2/1961 | Davis | 343/712 |
| 3,007,164 | 10/1961 | Davis | 343/712 |
| 3,066,293 | 11/1962 | Davis | 343/767 |
| 3,210,766 | 10/1965 | Parker | 343/743 |
| 3,364,487 | 1/1968 | Maheux | 343/702 |
| 3,611,388 | 10/1971 | Okumura | 343/712 |
| 3,717,876 | 2/1973 | Volkers et al. | 343/712 |
| 3,728,732 | 4/1973 | Igarashi | 343/876 |
| 3,742,508 | 6/1973 | Tomaszewski | 343/713 |
| 3,794,997 | 2/1974 | Iwatsuki et al. | 343/712 |
| 3,823,403 | 7/1974 | Walter et al. | 343/708 |
| 3,916,413 | 10/1975 | Davis | 343/712 |
| 3,961,292 | 6/1976 | Davis | 343/712 |
| 3,961,330 | 6/1976 | Davis | 343/712 |
| 3,972,048 | 7/1976 | Davis | 343/712 |
| 4,003,056 | 6/1977 | Davis | 343/712 |
| 4,080,603 | 3/1978 | Moody | 343/712 |
| 4,217,591 | 8/1980 | Czerwinski | 343/713 |
| 4,278,980 | 7/1981 | Ogita et al. | 343/748 |
| 4,317,121 | 2/1982 | Allen, Jr. et al. | 343/712 |
| 4,339,827 | 7/1982 | Torres et al. | 343/748 |
| 4,499,606 | 2/1985 | Rambo | 455/277 |
| 4,506,267 | 3/1985 | Harmuth | 343/744 |
| 4,566,133 | 1/1986 | Rambo | 455/277 |
| 4,633,519 | 12/1986 | Gotoh et al. | 455/277 |

(A)

(B)

(A)

(B)

AUTOMOBILE ANTENNA SYSTEM

BACKGROUND OF THE INVENTION

1. Field of the Invention

The present invention relates to an automobile antenna system, and more particularly, to an automobile antenna system for performing diversity reception.

2. Description of the Prior Art

Antenna systems are indispensable to automobiles which must positively receive various broadcast waves such as those for radio, television and telephone at the receivers located within the vehicle. Such antenna systems are also very important for citizen band transceivers.

However, high-frequency waves in a general VHF band such as FM broadcast waves have a strong tendency to experience rectlinear propagation, so that direct waves and other waves involving reflection from buildings, mountains or other obstacles interfere with each other and cause multipath noise such as distortion or momentary interruption of sound. An automobile antenna system with a single antenna cannot reduce such multipath noise which is produced at the time of reception of waves in a high-frequency band.

Furthermore, it is difficult to receive broadcast waves stably by a conventional pole antenna during the travel of a car, because, due to the directivity of the antenna, the receiving state of the antenna changes in correspondence with the direction in which the broadcast waves come every time the travelling direction of the automobile changes.

To solve this problem, a diversity-reception type antenna system has been proposed, in which two antennas are disposed on the vehicle body at predetermined intervals so that receiving operation is taken over by the antenna which enjoys superior reception by automatic changeover, whereby the directivity of the antenna is improved and the amount of multipath noise is lowered.

However, a conventional antenna is generally a pole antenna which projects outwardly from the vehicle body, and although it is superior in performance in its own way, it always remains a nuisance from the viewpoint of vehicle body design.

Furthermore, the pole antenna is disadvantageous in that it is subject to damage, vandalism or theft and also in that the antenna acts to generate noise during high-speed driving. For such reasons, there has been a strong desire to eliminate the need for such pole antennas.

Especially, when diversity reception is performed by an automobile antenna system, a plurality of antennas are required, as described above, and further, with the enlargement of the frequency bands for broadcast or communication waves received within automobiles, a multiplicity of antennas have been required in accordance with each frequency band.

As a result, the aesthetic appearance of the automobile is disadvantageously damaged, and the receiving performance is greatly deteriorated by electrical interference between antennas.

SUMMARY OF THE INVENTION

Accordingly, it is an object of the present invention to provide an automobile antenna system which is capable of effective diversity reception without damaging the aesthetic appearance of an automobile, thereby eliminating the above-described problems.

To achieve this aim, according to the present invention, a high-frequency pickup which efficiently picks up high-frequency currents induced on the vehicle body by broadcast waves is provided on both side end portions of the rear edge of the roof panel or the marginal edge of the trunk lid of an automobile provided with a windshield antenna, the side end portions being disposed well away from the windshield.

The present invention is characterized in that this pair of high-frequency pickups constitutes a space diversity antenna together with the windshield antenna.

As is clear from the above-described structure, in an automobile antenna system according to the present invention, both the windshield antenna and the pair of pickups are disposed within the interior of the vehicle body so as to avoid damaging the aesthetic appearance of the vehicle body.

In addition, since there is a selection of the antenna which enjoys better reception from among the windshield antenna and the high-frequency pickups, and both the windshield antenna and the high-frequency pickups are non-directional, a combination of these components enables effective non-directional space diversity reception.

The above and other objects, features and advantages of the present invention will become clear from the following description of the preferred embodiments thereof, taken in conjunction with the accompanying drawings.

DESCRIPTION OF THE PREFERRED EMBODIMENTS

Preferred embodiments of an automobile antenna system according to the present invention will be described hereinunder with reference to the accompanying drawings.

FIGS. 1 to 6 illustrate a process of examining the distribution characteristics of high-frequency currents so as to ascertain the location at which an antenna system can operate most efficiently on the vehicle body of an automobile.

Figure 1:
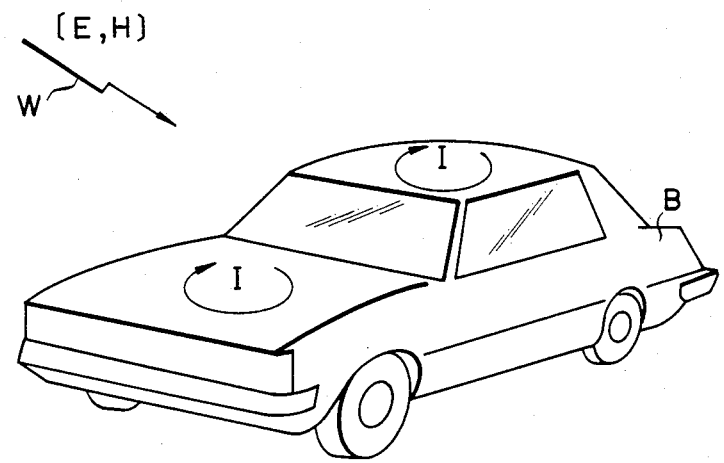
FIG. 1 illustrates surface currents I induced on the vehicle body B by external waves W.

FIG. 1 shows that when external electromagnetic waves W, such as broadcast waves, pass through the vehicle body B of conductive metal, surface currents I are induced at various vehicle locations at levels corresponding to the intensities of electromagnetic waves passing therethrough. The present invention aims at only electromagnetic waves of relatively high frequency bands in excess of 50 MHz, such as FM broadcast waves, television waves and the like.

The present invention is characterized in that the distribution of the surface currents induced on the vehicle body by electromagnetic waves within the above-described particular wave bands is measured so as to seek a location on the vehicle body which is higher in surface current density and lower in noise and at which a pickup used in the present invention is to be located.

The distribution of surface currents is determined by a simulation using a computer and also by measuring actual intensities of surface currents at various locations on a vehicle body. In accordance with the present invention, the measurement is carried out by the use of a probe which can operate in accordance with the same principle as that of a high-frequency pickup actually located on the vehicle body at a desired location, as will be described later. Such a probe is moved on the vehicle body throughout the entire surface thereof to measure the level of surface currents at various locations of the vehicle body.

Figure 2:
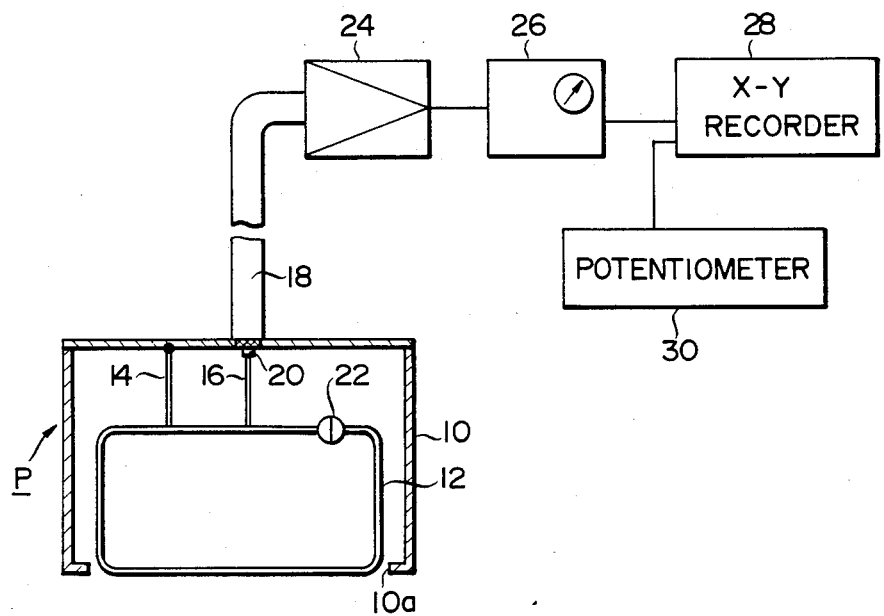
FIG. 2 illustrates a probe for detecting the distribution of surface currents on the vehicle body and having the same construction as that of the high-frequency pickup used in the present invention, and a circuit for processing signals from the probe.

FIG. 2 shows an example of such a probe P which is constructed in accordance with substantially the same principle as that of the high-frequency pickup described hereinafter. The probe P is composed of a casing 10 of electrically conductive material for preventing any external electromagnetic wave from transmitting to the interior thereof and a loop coil 12 fixed within the casing 10. The casing 10 includes an opening 10a formed therein through which a portion of the loop coil 12 is externally exposed. The exposed portion of the loop coil 12 is positioned in close proximity to the surface of the vehicle body B to detect magnetic flux induced by surface currents on the vehicle body B. Another portion of the loop coil 12 is connected with the casing 10 through a short-circuiting line 14. The loop coil 12 further includes an output end 16 connected with a core 20 in coaxial cable 18. Still another portion of the loop coil 12 includes a capacitor 22 for causing the frequency in the loop coil 12 to resonate relative to the desired frequency to be measured to increase the efficiency of the pickup.

Thus, when the probe P is moved along the surface of the vehicle body B and also angularly rotated at various locations of measurement, the distribution and direction of surface currents can accurately be determined at each of the vehicle locations. In FIG. 2, the output of the probe P is amplified by a high-frequency voltage amplifier 24 and the resulting output voltage is measured by a high-frequency voltmeter 26. This coil output voltage is read at the indicated value of the high-frequency voltmeter 26 and also is recorded by an XY recorder 28 to provide the distribution of surface currents at various vehicle locations. The input of the XY recorder 28 receives signals indicative of various vehicle locations from a potentiometer 30 to recognize the value of high-frequency surface currents at the corresponding vehicle location.

Figure 3:
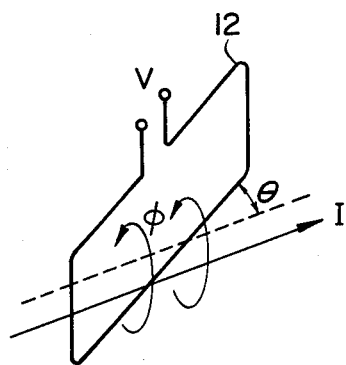
FIG. 3 illustrates the electromagnetic coupling between the surface currents I and the pickup loop antenna.
Figure 4:
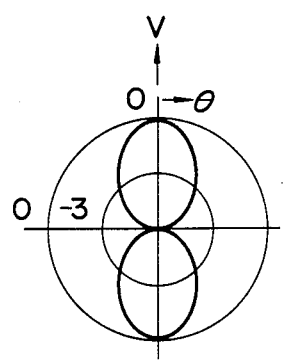
FIG. 4 illustrates the directional pattern of the loop antenna shown in FIG. 3.

FIG. 3 illustrates an angle $\theta$ of deflection between the high-frequency surface currents I and the loop coil 12 of the pickup. As is clear from the drawing, magnetic flux $\phi$ intersects the loop coil 12 to generate a detection voltage V in the loop coil 12. As shown in FIG. 4, when the angle $\theta$ of deflection is equal to zero, that is, the surface currents I are parallel to the loop coil 12 of the pickup, the maximum voltage can be obtained. The direction of the surface currents I when the probe P is rotated to obtain the maximum voltage can also be known.

Figure 5:
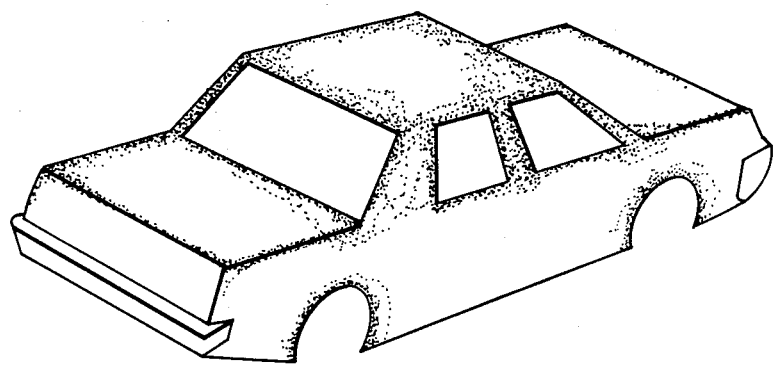
FIG. 5 illustrates the intensity distribution of the surface currents.
Figure 6:
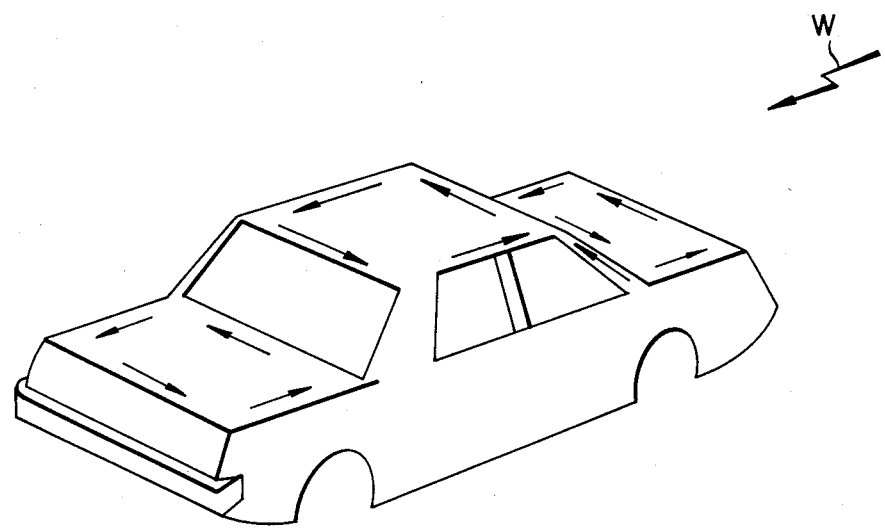
FIG. 6 illustrates the directions of flow of the surface currents.

FIGS. 5 and 6 respectively show the magnitude and direction of high-frequency surface currents induced at various different locations of the vehicle body at the frequency of 80 MHz, the values of which are obtained from the measurements of the probe P and the simulation effected by the computer. As can be seen from FIG. 5, the distribution of surface currents has higher densities at the marginal portions of the vehicle body and lower densities at the central portions of the flat vehicle panels.

It will also be apparent from FIG. 6 that the surface currents are concentrated in the direction parallel to the marginal edge of the vehicle body or in the direction along the connections of various flat panels.

It is found from the computer's simulation and various experimental measurements that the distance between the position where the high-frequency pickup is mounted and the marginal edge of the vehicle body and the distance which is suitable for practical use depends upon the carrier frequency used therein. It is also recognized that the distance is decreased as the value of the carrier frequency is increased.

From the fact that the suitable distance of 4.5 cm from the corresponding marginal vehicle portion is inversely proportional to the value of the carrier frequency, good results can be obtained relative to the respective values of the carrier frequency if the high-frequency pickup is spaced away from the marginal edge of a vehicle body within a distance represented by the following formula:

$$12 \times 10^{-3} \, c/f \, (m)$$

where c=the velocity of light and f=the carrier frequency.

Accordingly, the objects of the present invention are achieved on the basis of the above-described study by disposing a pair of high-frequency pickups on the rear edge of the roof panel at both ends thereof or on the front edge of the trunk lid of the vehicle body, also at both ends thereof, these locations being where surface currents are concentrated with high density.

First Embodiment

Figure 7:
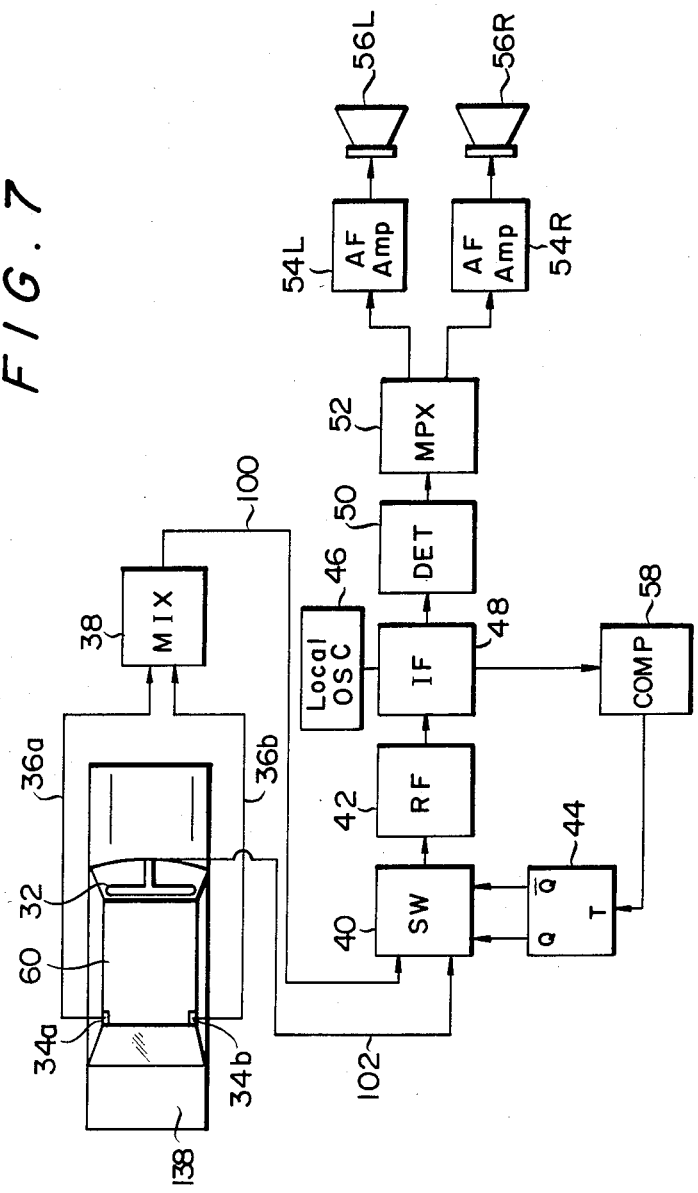
FIG. 7 is a schematic view of a first embodiment of an automobile antenna system according to the present invention.

FIG. 7 shows a first embodiment of an antenna system according to the present invention.

This embodiment is characterized in that high-frequency pickups 34a and 34b having a similar structure to that of the above-described probe are provided on the portion at each end of the rear edge of the roof panel of a vehicle which is provided with a known front windshield antenna 32, the pickups 34a, 34b in combination with the antenna 32 constituting a space diversity reception antenna.

It is known that antennas for a space diversity reception system can ordinarily obtain space diversity effects which are sufficient for practical use if the distance between them is more than λ/4 to λ/2, wherein λ represents wavelength. It will be understood that, since the distance between the front windshield antenna 32 and the high-frequency pickups 34 is about 2 m in FIG. 7, and the wavelength of the FM broadcast waves is about 3.00 m, this embodiment provides a very effective space diversity reception antenna system for these FM bands.

The structure of the circuit, for which broadcast waves are received by the antenna system, which enjoys better reception sensitivity is automatically selected from among the front windshield antenna 32 and the high-frequency pickups 34a, 34b as will be explained with reference to FIG. 7 in the following.

In FIG. 7, coaxial cables 36a, 36b which introduce the outputs of the high-frequency pickups 34a, 34b, respectively are connected to a mixer 38, which adds the outputs of the high-frequency pickups 34a, 34b together.

An output 100 obtained by adding the outputs of the pickups 34a, 34b together by the mixer 38 and an output 102 from the front windshield antenna 32 of the vehicle body are input to a high-frequency amplifying circuit 42 through a switch circuit 40.

The switch circuit 40 is changed over in accordance with the output from a T-shaped flip-flop circuit 44 which will be described later, so that either the output 102 of the antenna 32 or the output 100 obtained by adding the outputs of the pickups 34a, 34b together is selectively input to the high-frequency amplifying circuit 42, and is introduced to an intermediate frequency amplifying circuit 48 to which a local oscillator 46 is connected. As a result, a sound signal alone is fetched by a detecting circuit 50.

Thereafter, the sound signal is divided into a right output and a left output by a multiplexer 52, which are reproduced by speakers 56R and 56L, respectively, by way of right and left amplifiers 54R and 54L, respectively.

The output signal from the intermediate amplifying circuit 48 is compared with the threshold value of the signal by a comparator 58, where the threshold value of a signal supplied from the intermediate frequency amplifying circuit 48 is set in order to supply a trigger output for inverting the output of the T-shaped flip-flop circuit when the reception sensitivity of the front windshield antenna 32 or the high-frequency pickups 34a, 34b is lowered below a predetermined value. The comparator 58 compares the threshold value with the signal which is output from the intermediate frequency amplifying circuit 48 when broadcast waves are received by the antenna 32 or the high-frequency pickups 34a, 34b, and when the signal is below the threshold value, a trigger signal is supplied to the T-shaped flip-flop circuit 44 to invert the output thereof.

The inversion of the output causes the switch circuit 40 to change over the present antenna to an antenna enjoying better reception sensitivity from among the front windshield antenna 32 and the high-frequency pickups 34a, 34b.

In this way, the two high-frequency pickups 34a, 34b provided on both side end portions of the rear edge of the roof panel and the front windshield antenna 32 constitute a space diversity reception antenna, and automatic changeover to the antenna enjoying better reception sensitivity is constantly enabled.

The directivity of the front windshield antenna 32 is non-directional, as is shown in FIG. 8(A), and the directivity of the high-frequency pickup provided on the righthand end of the rear edge of the roof panel of the vehicle body is as is indicated by the broken line in FIG. 8(B), but the overall directivity of the right and left pickups is substantially non-directional, as is indicated by the solid line in FIG. 8(B). Therefore, a space diversity reception is enabled by the two antennas consisting of the front windshield antenna 32 and the high-frequency pickups 34a, 34b, thereby preventing any deterioration of the reception sensitivity in a specific direction, this being unavoidable in a conventional directional diversity reception system.

Figure 9:
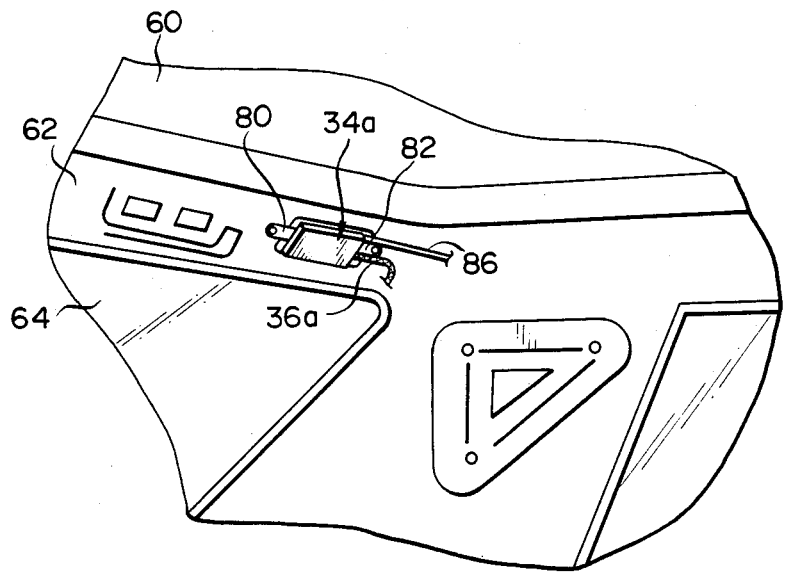
FIGS. 9 to 12 are explanatory views of the high-frequency pickups of the first embodiment, mounted on a roof panel.
Figure 10:
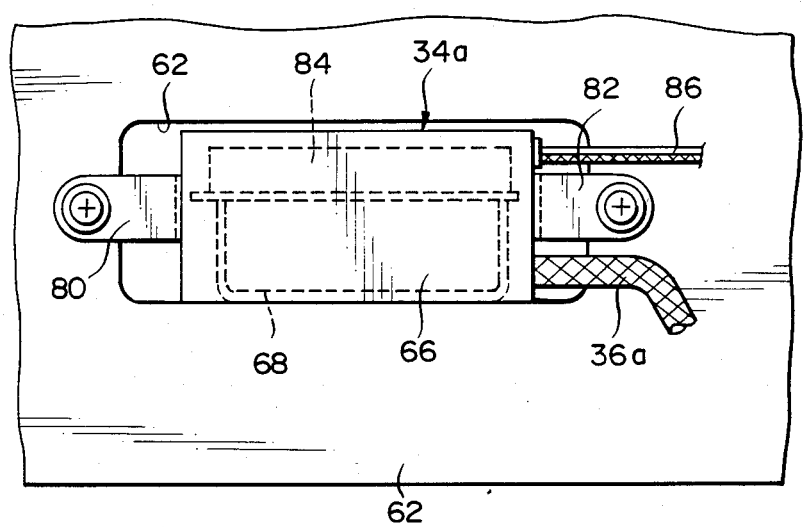

FIGS. 9 and 10 show an example of attachment of the high-frequency pickup 34 in this embodiment to the roof panel of the vehicle body.

A roof panel 60 is exposed in FIG. 9, and the metallic roof panel 60 is connected to a rear window glass 64 with a rear window frame 62 as its marginal edge. In this example, the high-frequency pickup 34 is disposed within a distance of 4.5 cm inward of the rear window frame 62.

As is shown in detail in FIG. 10, the high-frequency pickup 34a includes a metallic casing 66 which shields a loop antenna 68 provided therewithin from external magnetic flux, thereby constituting an electromagnetic coupling type pickup and having a structure similar to the above-described probe which includes a loop coil.

Figure 11:
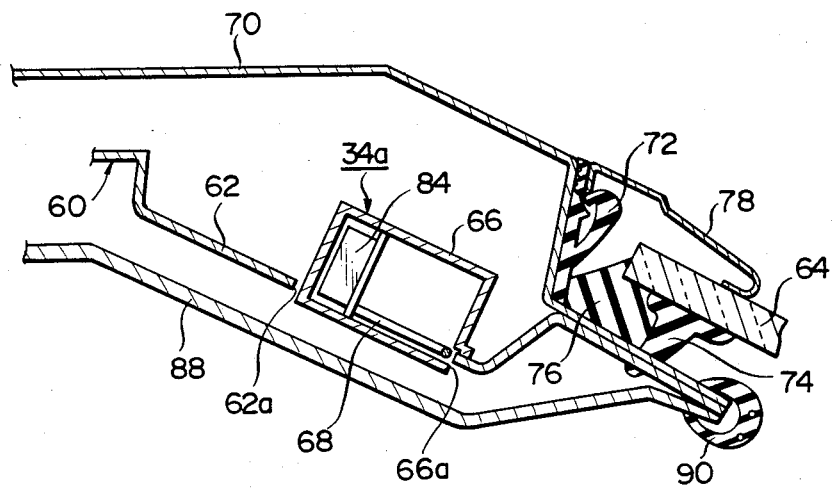

FIG. 11 is a cross sectional view of the high-frequency pickup 34a secured to the roof panel 60. The roof panel 60 includes a roof panel 70, and the rear window frame 62 is secured to one end of the roof panel 70. The rear window glass 64 is secured to the roof panel 70 through a fastener 72 and a dam 74, these two being tightly bonded by an adhesive 76.

A molding 78 is fixed between the roof panel 70 and the rear window glass 64.

In this example of attachment, an opening 62a is provided on a part of the rear window frame 62 in order that the casing 66 of the high-frequency pickup 34a may be inserted into the opening 62a, whereby the loop antenna 68 of the high-frequency pickup 34a is opposed to the marginal edge portion of the rear window frame 62.

As shown in FIG. 11, a part of the loop antenna 68 housed in the casing 66 is opposed to the marginal edge of the opening of the rearwindow frame 62 in proximity thereto. Therefore, the magnetic flux induced by the high-frequency surface currents and flowing at the marginal edge portion of the rear window frame 62 is positively received by the loop antenna 68 to be introduced into the casing 66, and is safely shielded from external flux by the casing 66, so that the currents induced on the vehicle body can be detected with good sensitivity by the high-frequency pickup 34a.

Figure 12:
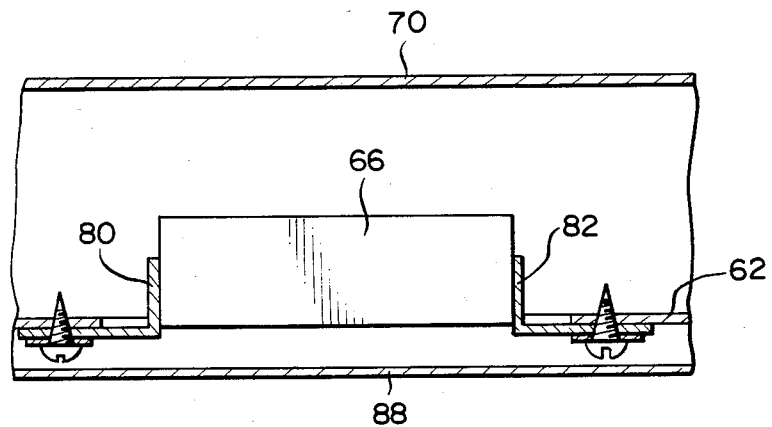

In order to exactly locate and fix the casing 66 of the high-frequency pickup 34a in relation to the rear window frame 62, L-shaped brackets 80, 82 are attached to both side ends of the casing 66 by bolts or the like, as shown in FIG. 12, and the brackets 80, 82 are screwed to the rearwindow frame 62.

The casing 66 of the high-frequency pickup 34a is provided with circuitry 84 therewithin, which is connected to the loop antenna 68 and is provided with a pre-amplifier and the like for processing a detected signal. The high-frequency detection signal obtained in this way is externally fetched from the coaxial cable 36a and is processed by the diversity reception circuit shown in FIG. 7. A power source and a signal for controlling the circuit is supplied from a cable 86 to the circuitry 84.

The loop antenna 68 is in the form of a single wound coil which is covered with an insulation such that the coil can be arranged in an electrically insulated relationship with and in close contact with the marginal portion of the rear window frame 62. Thus, the magnetic flux induced by the surface currents can intersect the loop antenna 68 with an increased intensity.

After the high-frequency pickup 34a is secured to the exposed roof panel 60, in particular, to the rear window frame 62 in this manner, a roof garnish 88 is secured to the roof panel 60, and an edge molding 90 is fixed at the end portions of the roof garnish 88 and the rear window frame 62.

In this example of attachment, the side of the loop antenna 68 exposed from the casing 66 is disposed within a distance of 4.5 cm from the marginal edge of the rear window frame 62, whereby the FM broadcast waves of a frequency of 80 MHz can be positively detected from the surface currents flowing on the marginal edge portions of the rear window frame 62 of the vehicle body. Since the surface currents flow along the marginal edge of the vehicle body, as shown in FIG. 6, the loop antenna 68 is longitudinally disposed along the marginal edge of the rear window frame 62 in this example.

As described above, according to this example of attachment, the surface currents flowing at the marginal portions of the vehicle body, in particular, at the marginal edge portion of the roof panel, are electromagnetically detected by the high-frequency pickup, and positive reception in the high-frequency bands is enabled without any external exposure of the high-frequency pickup. Thus this pickup is very useful as a high-frequency pickup constituting a space diversity antenna. In addition, since it does not project outwardly from the vehicle body unlike a pole antenna, it does not damage the aesthetic appearance of the vehicle body, and can be easily attached after the completion of the vehicle body assembly so as to improve the receiving performance of the antenna system.

Second Embodiment

Figure 13:
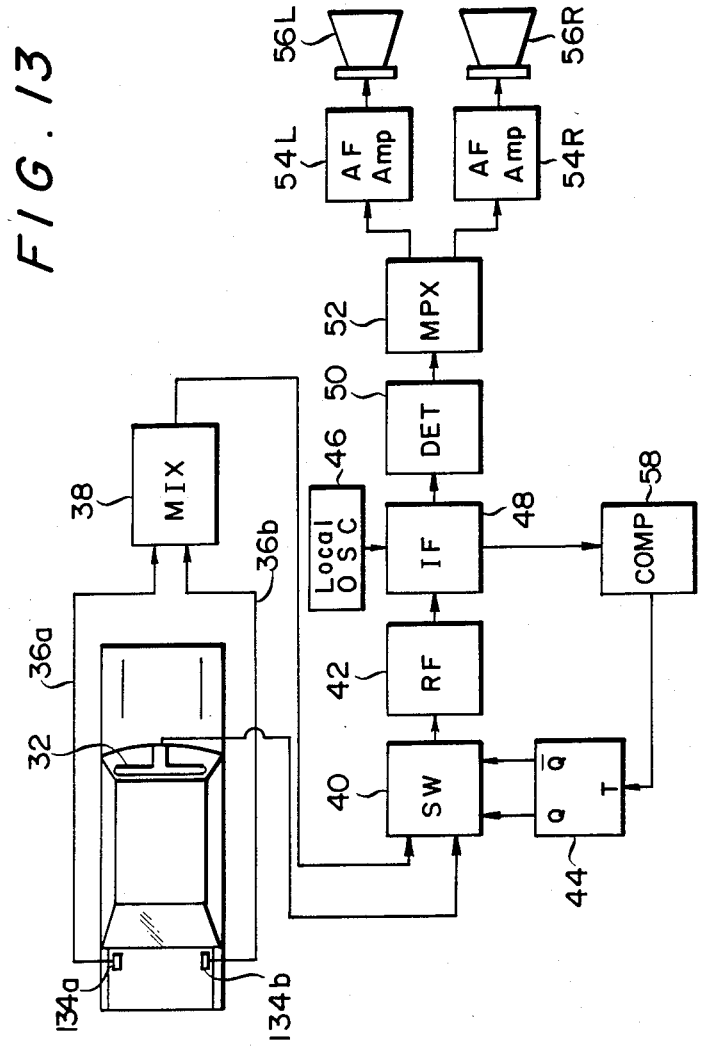
FIG. 13 is a schematic view of a second embodiment of an automobile antenna system according to the present invention.

A second embodiment of the present invention will be shown in FIG. 13.

This embodiment is characterized in that high-frequency pickups 134a, 134b similar to those explained in the first embodiment are disposed at both side end portions of the front marginal edge of the trunk lid of the vehicle body which is provided with the front windshield antenna, thereby constituting a space diversity antenna together with the front windshield antenna.

In FIG. 13, other parts of the structure are the same as those shown in the first embodiment, like reference numerals denoting like elements and their explanation being omitted.

Figure 8:
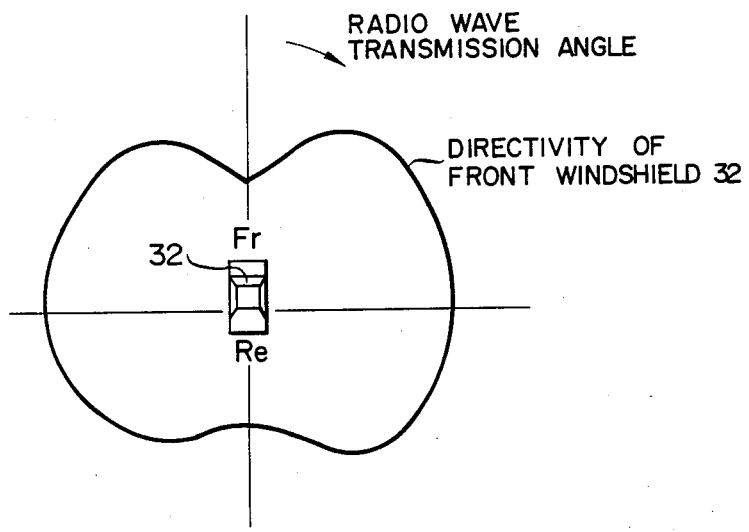
FIGS. 8(A) and 8(B) illustrate the directivities of the embodiment shown in FIG. 7.
Figure 8:
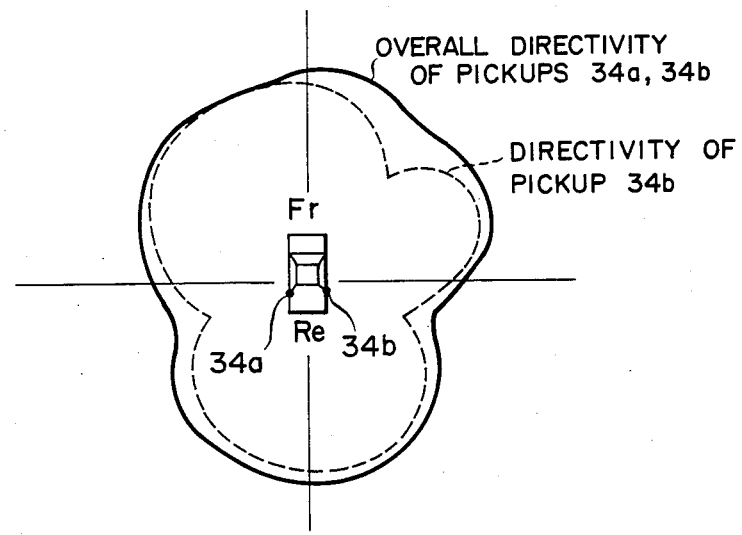

The characteristics of the front windshield antenna 32 and the high-frequency pickups 134a, 134b are also substantially the same as the characteristics of those in the first embodiment shown in FIG. 8, their explanation also being omitted.

Figure 14:
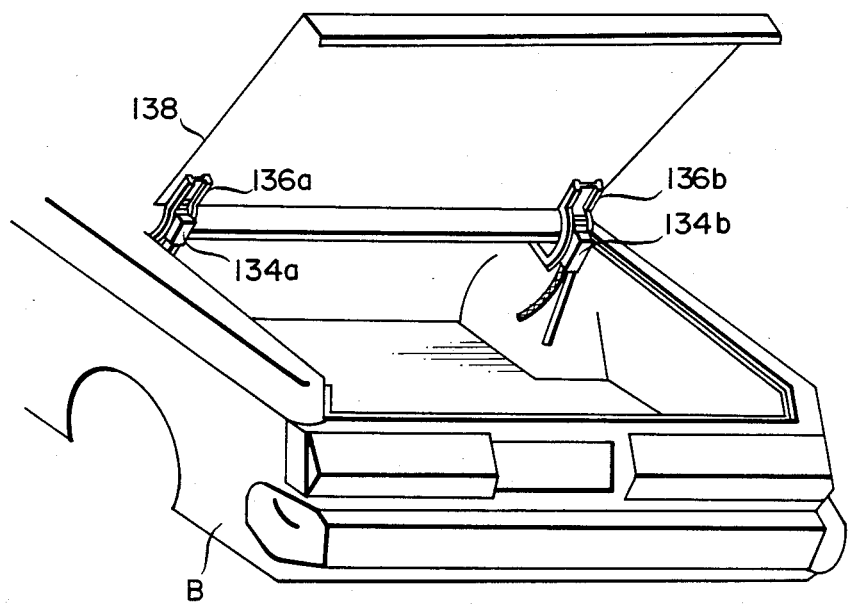
FIGS. 14 to 16 are explanatory views of the high-frequency pickups of the second embodiment, mounted on trunk hinges.
Figure 15:
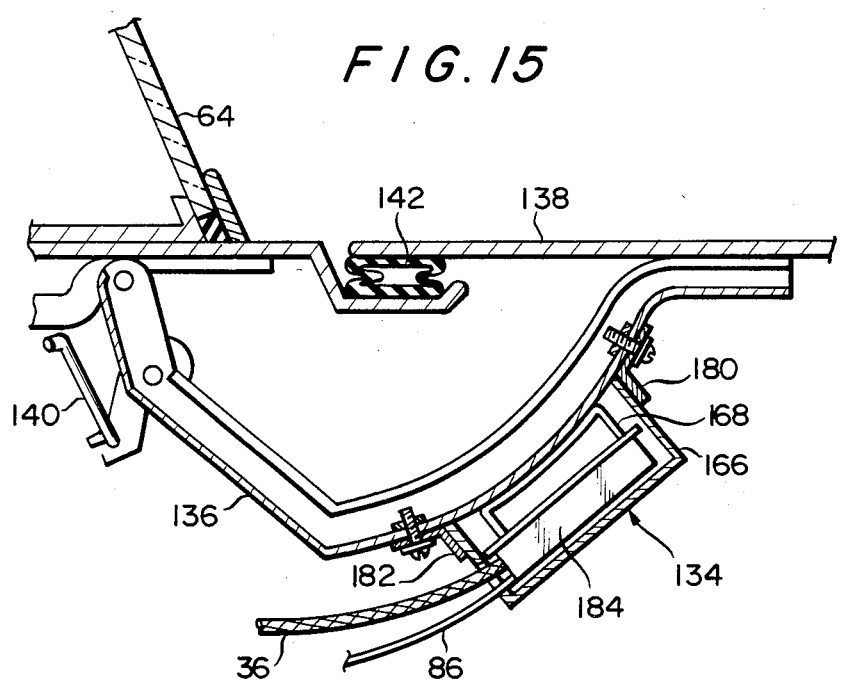
Figure 16:
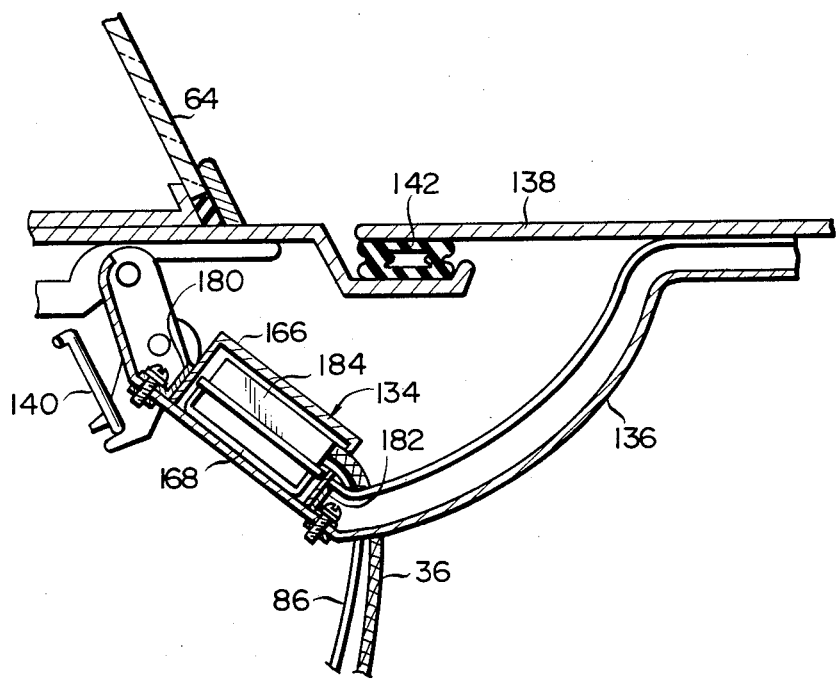

FIGS. 14 to 16 illustrate an example in which the high-frequency pickups in this embodiment are attached to hinges which connect the trunk lid and the vehicle body so that the surface currents concentrated on each hinge with high density are picked up by the high frequency pickups.

Since the trunk hinges are situated well away from the engine and are not likely difficult to be influenced by the noise of the vehicle, the detected currents can provide a good detection value with a superior S/N ratio.

FIG. 14 shows a first example of attachment in which the high-frequency pickups in this embodiment are secured to the trunk hinges, and FIG. 15 shows it in detail. The high-frequency pickup 134 in this example is an electromagnetic coupling type pickup, and has a structure similar to that of the above-described probe which is used for detecting the distribution of the surface currents on the vehicle body and which includes a loop coil.

The trunk hinge 136 with one end thereof rotatably supported by the vehicle body and the other end secured to the trunk lid 138 rotatably supports the trunk lid 138.

A torsion bar 140 is provided on the end of the trunk hinge 136 which is rotatably supported by the vehicle body, so as to control the opening degree of the trunk lid 138 when it is open. As is known, a water sealing weather strip 142 is provided between the trunk lid 138 and the vehicle body, thereby preventing the ingress of rainwater from the rearwindow glass 64.

In this example of attachment, the high-frequency pickup 134 is longitudinally fixed on the outer surface of the trunk hinge 136, namely on the side facing the trunk void, in such a manner that the longitudinal side of a loop antenna 168 provided within the high-frequency pickup 134 is disposed in parallel to the longitudinal side of the trunk hinge 136. In this way, the loop antenna 168 in this embodiment can positively catch the surface currents flowing on the trunk hinge 136 with high efficiency.

The high-frequency pickup 134 includes a casing 166 formed of a conductive material. The casing 166 is provided with the loop antenna 168 and circuitry 184 containing a pre-amplifier and the like therewithin, and the opening portion of the casing 166 is opposed to the trunk hinge 136. L-shaped brackets 180, 182 are secured to both end portions of the casing 166, and one end of each of the L-shaped brackets 180, 182 is firmly screwed to the trunk hinge 136. Therefore, it will be understood that the magnetic flux alone which is induced by the high-frequency surface currents flowing on the trunk hinge 136 is introduced into the casing 166, and is safely shielded from external magnetic flux by the casing 166.

The loop antenna 168 is preferably provided along the trunk hinge 136, and is preferably provided in a form which is in conformity with the curvature of the hinge 136.

The power source and a signal for controlling the circuit is supplied from the cable 86 to the circuitry 184, and the high-frequency detection signal fetched by the loop antenna 168 is fetched outward from the coaxial cable 36 and is processed by the circuit shown in FIG. 13.

The loop antenna 168 is in the form of a single wound coil which is covered with an insulation such that the coil can be arranged in an electrically insulated relationship with and in close contact with the trunk hinge 136. Thus, the magnetic flux induced by the surface currents can intersect the loop antenna 168 with an increased intensity.

As described above, in this example of attachment, surface currents are detected by the high-frequency pickups from the trunk hinges which are unrelated to the detection of the surface currents in the prior art. In this manner, secure reception in the high-frequency bands is enabled without any external exposure of the antenna system, and a very useful automobile antenna system is thus provided.

Another example of attachment of the pickups are shown in FIG. 16. This example is approximately the same as that shown in FIG. 15 and is different only in that the high-frequency pickup 132 is disposed at the back of the trunk hinge 136. The high-frequency pickup 132 is an electromagnetic coupling type pickup, and is provided with the loop antenna 168 and the circuitry 184 therewithin. The pickup 132 is firmly secured to the back of the trunk hinge 136 by the L-shaped brackets 180, 182.

According to the example of this attachment, the high-frequency pickup 134 does not project into the trunk void from the trunk hinge 136, and thereby advantageously does not come into contact with or damage baggage or the like placed within the trunk.

Although an electromagnetic coupling type pickup is used as the high-frequency pickup in the above-described examples of attachment, since this embodiment is characterized by detection of the surface currents on the trunk hinge for reception of external waves (which has never been aimed at in the prior art), an electrostatic coupling type pickup is also usable as the high-frequency pickup as well as the electromagnetic coupling type pickup.

When an electrostatic coupling type pickup is used, a detection electrode is disposed along the longitudinal side of the trunk hinge 136 shown in the above-described drawings through an air layer or an insulation board, and high-frequency surface currents are fetched to the detection electrode side through the electrostatic capacity formed between the surface of the hinge and the detection electrode, thereby making it possible to fetch a high-frequency signal in a desired band.

Figure 17:
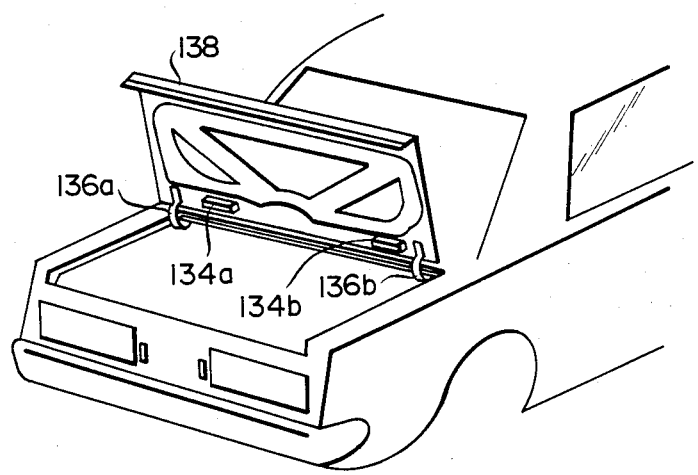
FIGS. 17 and 18 are explanatory views of the high-frequency pickups of the second embodiment, mounted on the marginal edge portion of the trunk lid.
Figure 18:
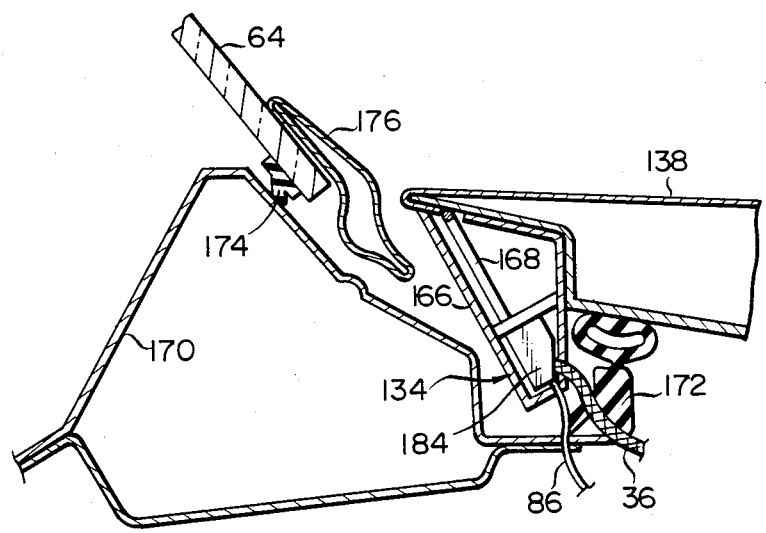

FIGS. 17 and 18 show still another example of attachment of the high-frequency pickup according to the embodiment to the marginal edge portion of the trunk lid 138.

In FIG. 18, a water sealing weather strip 172 is provided between the trunk lid 138 and a rear tray panel 170 in order to prevent the ingress of rainwater and the like.

A dam 174 is inserted between the rear window glass 64 and the rear tray panel 170 for sealing them in order to prevent rainwater, noise, and the like from entering at this point, and a molding 176 is provided at the lower end of the outer surface of the rear window glass 176.

This example is characterized in that the high-frequency pickup 134 is secured to the marginal edge portion of the trunk lid 138 which faces the rear tray panel 170. The loop antenna 168 provided within the pickup 134 is disposed in such a manner that the longitudinal side thereof is in parallel to the longitudinal edge of the trunk lid 138. The loop antenna 168 is disposed within a distance of $12 \times 10^{-3}$ c/f (m), namely within a distance of 4.5 cm at the time of receiving FM broadcast waves of a frequency of 80 MHz, and thereby the surface currents concentrated on the marginal edge portion of the trunk lid 138 can be caught positively and with high efficiency by the loop antenna 168.

As described above, since the high-frequency surface currents are detected by the high-frequency pickup disposed inside of the trunk lid in this example, a space diversity antenna is constituted without any external exposure of the high-frequency pickup.

Third Embodiment

Figure 19:
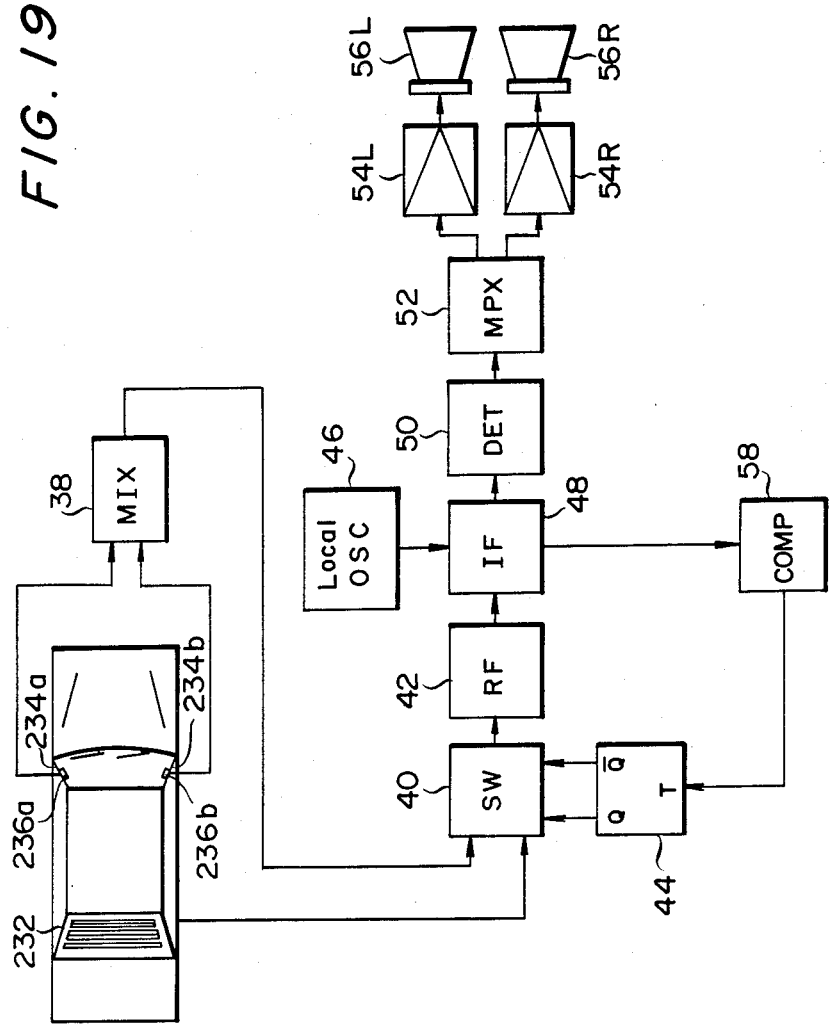
FIG. 19 is a schematic view of a third embodiment of an automobile antenna system according to the invention.

FIG. 19 shows a third embodiment of the present invention.

Figure 20:
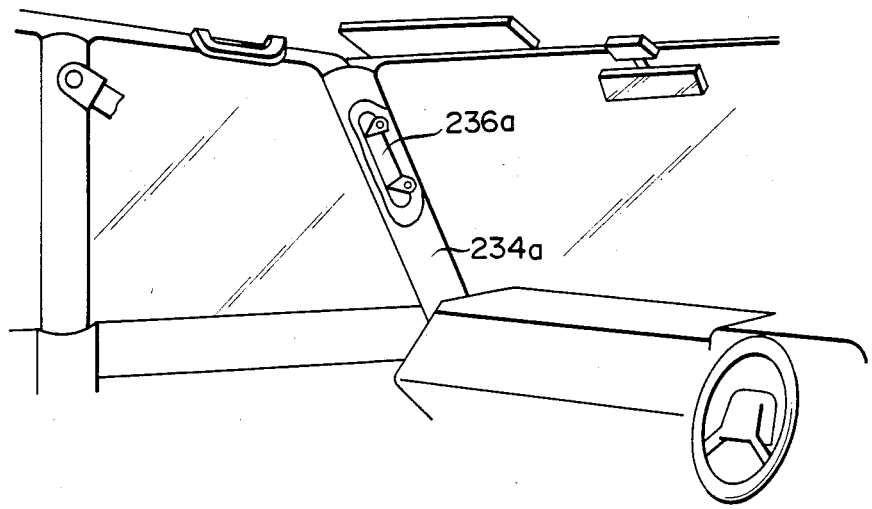
FIG. 20 is a schematic explanatory view of an arrangement of a front pillar on which a high-frequency pickup constituting a sub-antenna is installed with respect to a rear window glass antenna.

This embodiment is characterized by the structure in that high-frequency pickups 236a, 236b similar to those described above are provided on front pillars 234a, 234b, respectively, of the vehicle body which is provided with a rear windshield antenna 232, so as to constitute a space diversity together with the rear windshield antenna 232. The structure and a method of attachment of 234a of the high-frequency pickups 234a, 234b which serve as a sub-antenna with respect to the rear windshield antenna 232 will be explained with reference to FIGS. 20 to 22 in the following.

Figure 21:
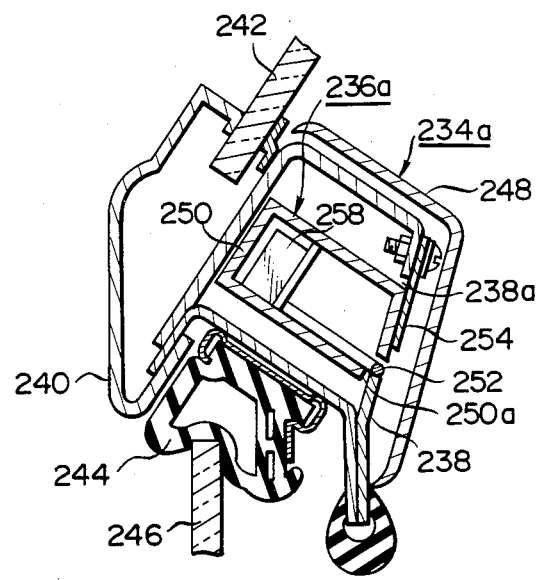
FIG. 21 is a cross sectional view of the front pillar shown in FIG. 20, with an electromagnetic coupling type high-frequency pickup mounted thereon.

As is clear from the cross sectional view in FIG. 21, the pillar 234 includes a hollow prism as its main pillar and a pedestal plate 238 provided on the hollow prism. A windshield molding 240 is secured to the side surface of the pedestal plate 238 which faces the exterior of the vehicle body, and the front window glass 242 is retained by the molding 240.

A weather strip rubber 244 is secured to the surface of the pedestal plate 238 which faces the rear portion of the vehicle body, thereby maintaining the sealed state of the joint between a window glass and the pedestal plate 238.

Furthermore, a front pillar garnish 248 is mounted on the surface of the pedestal plate 238 which faces the interior of the vehicle body, so as to maintain the aesthetically pleasing appearance of the pillar by enclosing the surface of the pedestal plate 238.

In this embodiment, the high-frequency pickup 236a of an electromagnetic coupling type is disposed in the longitudinal direction of the front pillar 234a in such a manner that the pickup 236a is inserted into the hollow portion of the pedestal plate 238.

Figure 22:
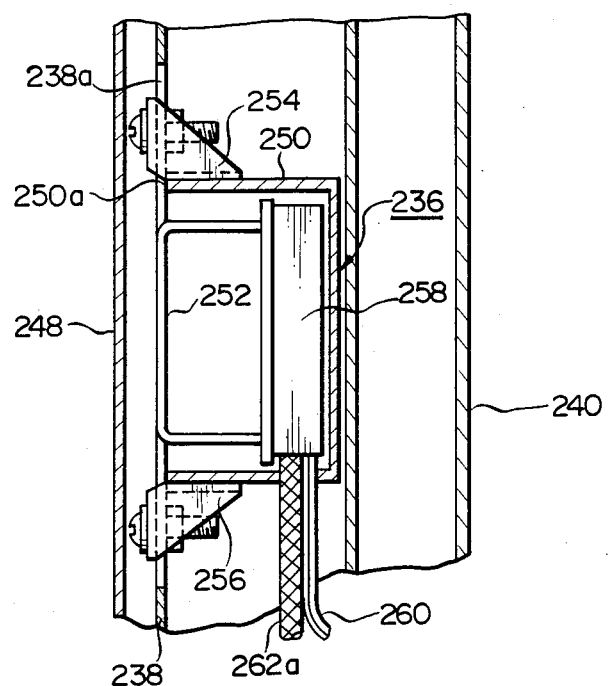
FIG. 22 is a fragmentary vertical sectional view of the front pillar shown in FIG. 21.

The high-frequency pickup 236a is composed of a casing 250 of a conductive material and a loop antenna 252 provided therewithin, as is obvious from FIGS. 21 and 22. The casing 250 for shielding the loop antenna from external electromagnetic field is provided with an opening 250a at one side thereof. The loop antenna 252 is exposed from the opening 250a and is disposed in proximity to the pillar, in particular, the pedestal plate 238, where high-frequency surface currents concentratedly flow.

An opening 238a is provided at a part of the pedestal plate 238 in this embodiment, in order that the high-frequency pickup 236a is inserted into the hollow pillar through the opening 238a before the front pillar garnish 248 is secured.

In order to secure the casing 250 of the high-frequency pickup 236a to the pedestal plate 238, brackets 254, 256 are fixed to both sides of the casing 250 by spot welding or the like, and the brackets 254, 256 are tightly screwed to the pedestal plate 238, as shown in FIG. 22.

Accordingly, the loop antenna 252 in this fixed state is so disposed as to be opposed and in proximity to the opening 238a of the pedestal plate 238, and the magnetic flux induced by the high-frequency surface currents which are concentrated and flowing on the pedestal plate 238 effectively intersect the loop antenna 252.

A circuitry 258 including a pre-amplifier and the like is housed behind the loop antenna 252 in the casing 250. Power source and a signal for controlling the circuit is supplied from a cable 260 to the circuitry 258, and the high-frequency detection signal fetched by the loop antenna 252 is fetched outward from a coaxial cable 262 and is processed by a circuit similar to that used for examining distribution of surface currents.

The loop antenna 252 is in the form of a single wound coil which is covered with an insulation such that the coil can be arranged in an electrically insulated relationship with and in close contact with the pillar pedestal plate 238. Thus, the magnetic flux induced by the surface currents concentratedly flowing on the pedestal plate 238 can intersect the loop antenna 252 with good efficiency.

After the high-frequency pickup 236a is inserted into the front pillar 234a in this way, the front pillar 234a is covered with the front pillar garnish 248. Thus the structure of the front pillar 234a is perfectly the same as an ordinary pillar in terms of external appearance.

The high-frequency pickup 236b similar to the pickup 236a is provided at the other front pillar 234b, as shown in FIG. 19, and since the structure and the method of attaching it is the same as those of the high-frequency pickup 236a, explanation thereof will be omitted.

The outputs of the high-frequency pickups 236a, 236b provided on the front pillars 234a, 234b, respectively, are added together. In this way, the high-frequency pickups 236a, 236b in combination constitute a sub-antenna, and constitute a space diversity reception antenna together with the rear windshield antenna 232.

The diversity reception circuit for supplying the output of the rear windshield antenna 232 and adding the outputs of the high-frequency pickups 236a, 236b together is the same as that shown in FIG. 7, like reference numerals being provided for like elements and their explanation being omitted.

As described above, according to the embodiment, the high-frequency pickups 236a, 236b attached to the front pillars 234a, 234b, respectively, and the rear windshield antenna 232 constitute a space diversity reception antenna, and automatic changeover to the antenna enjoying superior reception is constantly enabled.

Figure 23:
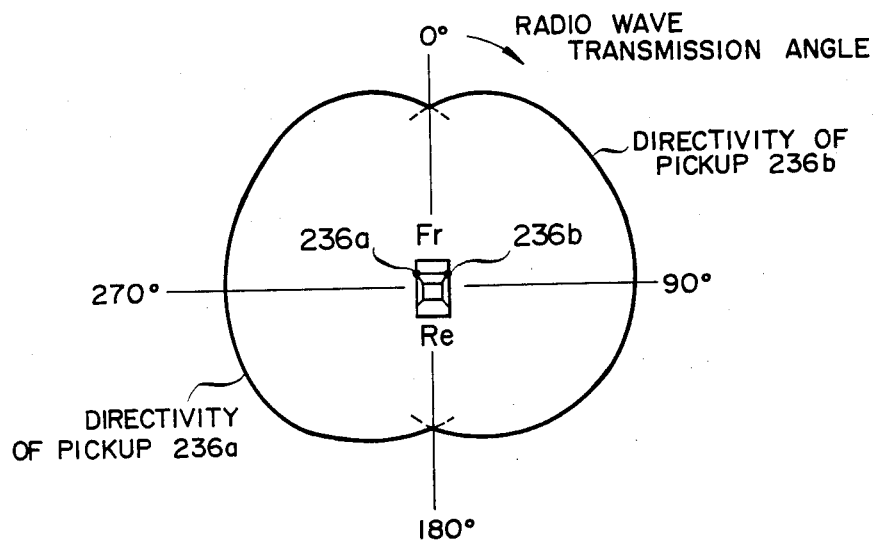
FIG. 23(A) illustrates the directivities of the high-frequency pickups disposed on front pillars.
FIG. 23(B) illustrates the directivity of the rear window glass antenna.
Figure 23:
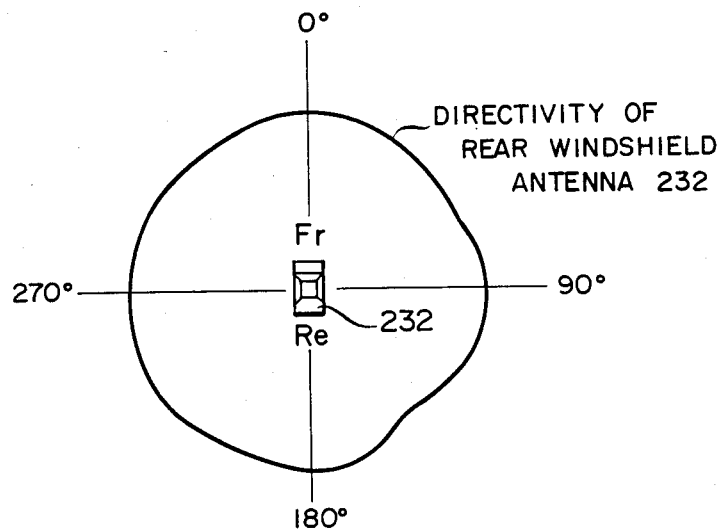

This structure makes the directivity of the high-frequency pickups 234a, 234b which are attached to the front pillars 234a, 234b, respectively, substantially non-directional, as shown in FIG. 23(A), and since the rear windshield antenna 232 is approximately non-directional, as shown in FIG. 23(B), the two non-directional antennas consisting of the rear windshield antenna 232 and the high-frequency pickups 236a, 236b enable space diversity reception, thereby preventing any deterioration of the reception sensitivity in a specific direction, this being unavoidable in a conventional directional diversity reception system.

In addition, since, in this invention, no antenna projects outwardly as in the case of a pole antenna, there is no damage to the aesthetic appearance of the vehicle body. Further, the antenna system according to the invention can be easily attached after the completion of the vehicle body assembly so as to improve its receiving performance.

As has been described in detail, according to the present invention, a space diversity antenna is composed of a pair of non-directional antennas consisting of a windshield antenna and high-frequency pickups, so that the space diversity effects are improved and the antennas are easily attached to a vehicle body after completion of the vehicle body assembly without damaging the aesthetic appearance of the vehicle body.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A space diversity automobile antenna system comprising:
   a windshield antenna having an antenna wire fixed to a windshield of a vehicle body;
   first high-frequency pickup means for detecting high-frequency surface currents induced by broadcast waves and concentratedly flowing at a first marginal edge portion of the vehicle body, said first high-frequency pickup means being disposed on a first side of the vehicle body in close proximity to the first marginal edge portion of the vehicle body;
   second high-frequency pickups means for detecting high-frequency surface currents induced by broadcast waves and concentratedly flowing at a second marginal edge portion of the vehicle body, said second high-frequency pickup means being disposed on a second side of the vehicle body in close proximity to the second marginal edge portion of the vehicle body;
   means for combining signals detected by said first and second high-frequency pickup means and for outputting a combined signal; and
   diversity reception circuit means, for selecting the stronger of the combined signal, received from said combining means, and a signal received by said windshield antenna.

2. An automobile antenna system according to claim 1, wherein said windshield antenna is provided on a front windshield.

3. An automobile antenna system according to claim 2, wherein said diversity reception circuit means includes:
   a mixer for adding the outputs of said first and second high-frequency pickup means together; and
   a switch circuit for selectively changing over from the output of said mixer to the output of said windshield antenna, or vice versa.

4. An automobile antenna system according to claim 2, wherein said first and second high-frequency pickup means are secured to the rear edge of a roof panel at both sides thereof.

5. An automobile antenna system according to claim 4, wherein each of said first and second high-frequency pickup means includes a casing which is inserted into and secured to an opening provided on each end of said rear window frame, and a loop antenna which is housed in said casing such as to be in proximity to the marginal edge portion of said rear window frame.

6. An automobile antenna system according to claim 2, wherein said first and second high-frequency pickup means are provided on respective different sides of a trunk lid.

7. An automobile antenna system according to claim 6, wherein said first and second high-frequency pickup means are provided on respective first and second trunk hinges.

8. An automobile antenna system according to claim 6, wherein said diversity reception circuit means includes:
   a mixer for adding the outputs of said first and second high-frequency pickup means together; and
   a switch circuit for selectively changing over from the output of said mixer to the output of said windshield antenna, or vice versa.

9. An automobile antenna system according to claim 1, wherein said windshield antenna is provided on a rear windshield.

10. An automobile antenna system according to claim 9, wherein said diversity reception circuit means includes:
    a mixer for adding the outputs of said first and second high-frequency pickup means together; and
    a switch circuit for selectively changing over from the output of said mixer to the output of said windshield antenna, or vice versa.

11. An automobile antenna system according to claim 1, wherein each of said first and second high-frequency pickup means are provided on respective first and second front pillars.

12. An automobile antenna system according to claim 11, wherein said diversity reception circuit means includes:
    a mixer for adding the outputs of said first and second high-frequency pickup means together; and
    a switch circuit for selectively changing over form the output of said mixer to the output of said windshield antenna, or vice versa.

13. An automobile antenna system according to claim 1, wherein said diversity reception circuit means includes:
    a mixer for adding the output of said first and second high-frequency pickup means together; and
    a switch circuit for selectively changing over from the output of said mixer to the output of said windshield antenna, or vice versa.

* * * * *